UNITED STATES PATENT OFFICE.

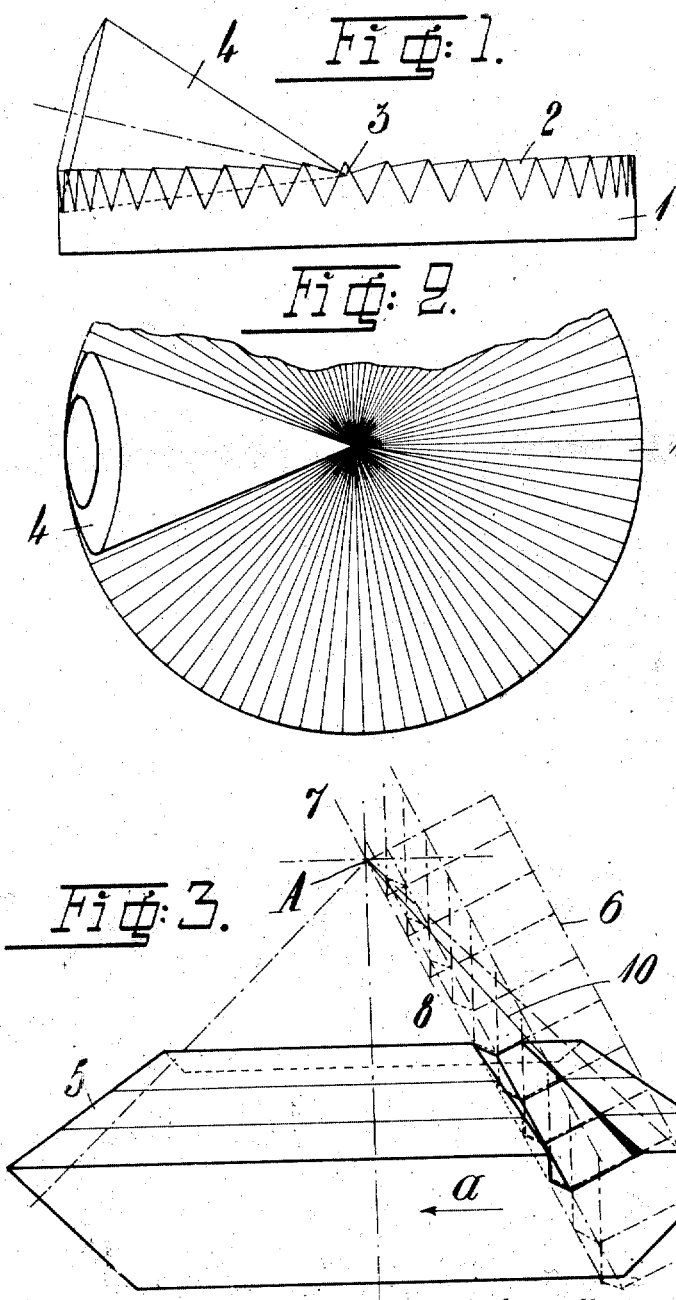

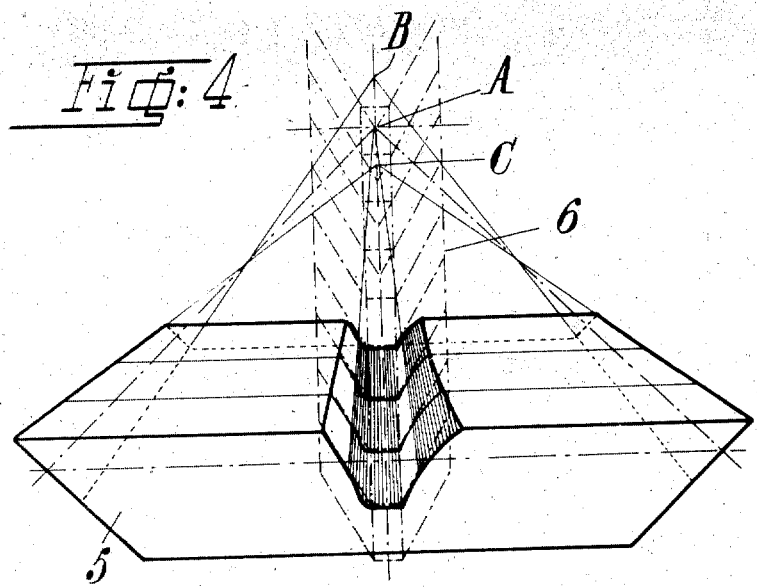
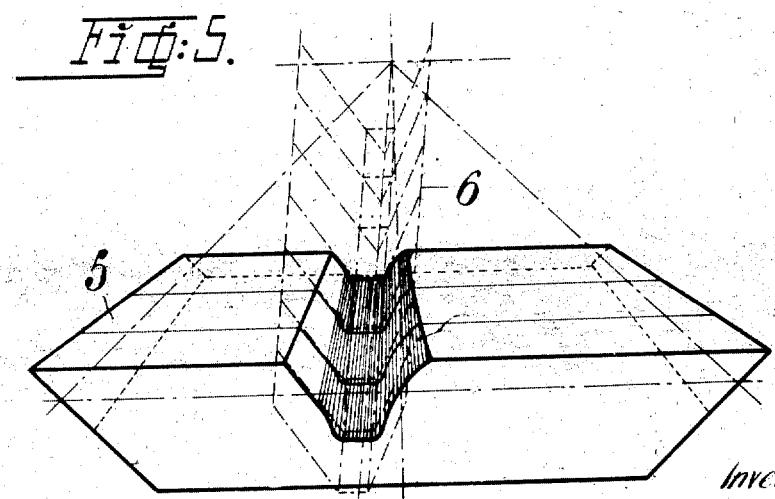

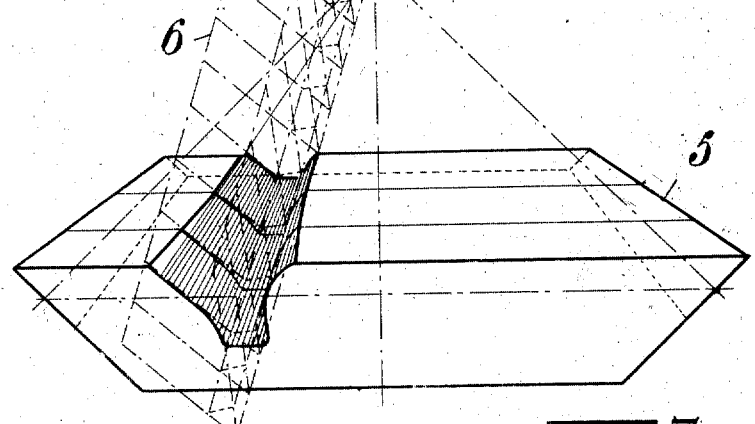
Fig: 6.
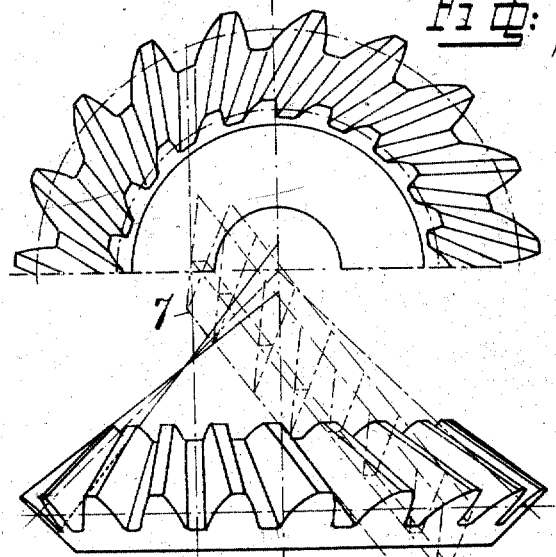
Fig: 7.

ERIK HJALMAR WINGQVIST, OF GOTTENBORG, SWEDEN, ASSIGNOR, BY DIRECT AND MESNE ASSIGNMENTS, OF ONE-HALF TO AKTIEBOLAGET SVENSKA KULLAGERFABRIKEN, OF GOTTENBORG, SWEDEN, A CORPORATION OF SWEDEN, AND ONE-HALF TO BROWN-LIPE GEAR COMPANY, OF SYRACUSE, NEW YORK, A CORPORATION OF NEW YORK.

BEVEL GEAR-WHEEL.

1,281,734.     Specification of Letters Patent.     Patented Oct. 15, 1918.

Application filed March 17, 1915. Serial No. 14,904.

*To all whom it may concern:*

Be it known that I, ERIK HJALMAR WINGQVIST, a citizen of the Kingdom of Sweden, residing at Gottenborg, Sweden, have invented new and useful Improved Bevel Gear-Wheels, of which the following is a specification.

In the majority of bevel gear-wheels hitherto known the outer surfaces of the teeth, and thus the surfaces bounding the gap or space between two adjacent teeth, are generally so shaped that they, if extended in the direction toward the axis of the wheel, converge in one point, viz; the apex of the pitch-cone or, in skew-toothed bevel-wheels having non-radial teeth, in a point at a distance from said apex determined by the angle of the teeth. Consequently the bottom surfaces of the gaps between the teeth are tapered from the outer edge toward the apex of the cone. Such teeth may, it is true, be cut in machines, but each side-wall bounding the gaps between the teeth must, on account of this tapering bottom surface, be cut separately. Thus the cutting of bevel gear-wheels, compared with the cutting of spur-wheels, is tedious and expensive. The attempts hitherto made to reduce the cost of manufacturing bevel gear-wheels have been directed to improvements in the machines used for their manufacture, and although certain progress has been made in this respect, the improvements have not, however, been of any great importance owing to the necessity which has not yet been overcome, of making each gap by two separate cutting operations.

The difficulties mentioned above are obviated by means of the present invention, according to which a bevel gear-wheel is so formed that the bottom surfaces of the gaps between adjacent teeth lie on, or approximately on, the surface of a cone or other convergent pyramidal surface whose apex is situated beyond (measured from the gear-wheel) the apex of the normal pitch-cone, and the side surfaces of the teeth are formed on substantially customary theoretically correct lines convergent upon the apex of the normal pitch-cone. By this apparently insignificant modification, it is possible, as will be described below, to cut simultaneously both sides of a gap between adjacent teeth by means of a single tool in one and the same working operation. Thus the manufacture of bevel gear-wheels is rendered as simple and may be effected as readily as the manufacture of ordinary spur-wheels.

Preferably in a bevel gear-wheel according to this invention the bottom surface of a gap aforesaid is of uniform width throughout its length.

A further object of the invention is to provide a bevel gear-wheel wherein the top edges of the teeth lie on, or approximately on, the surface of a cone or other pyramid whose apex is situated nearer to the wheel than is the apex of the normal pitch-cone.

The invention will be more clearly understood from the following description read in conjunction with the accompanying diagrammatic drawings, in which—

Figures 1 and 2 illustrate a pitch-cone and generating wheel in elevation and plan respectively for the purpose of explaining the principles underlying the usual formation of bevel gear-wheels;

Figs. 3 to 5 diagrammaticaly illustrate various phases of construction of radial toothed bevel gear-wheels according to the present invention, and Figs. 6 and 7 illustrate the formation of skew-toothed bevel gear-wheels also made according to the present invention.

Figs. 1 and 2 illustrate a so-called generating wheel 1 supposed to be made of hard material and a cone 4 supposed to be made of plastic material. The generating wheel 1 is provided with teeth 2 in the form of three-sided pyramids, the tops of which converge in a point 3 on the axis of the generating wheel. The cone 4 may be supposed to form a gear-wheel blank having its apex coincident with the point to which the teeth of the generating wheel converge. If the cone, while kept pressed against the generating wheel 1, is set in rolling motion around the same, the teeth 2 will generate impressions in the cone. The shape of these impressions corresponds to the shape of the teeth 2, except that the side surfaces become curved. The contact between a tooth 2 and the cone 4 during the rolling movement of the latter always takes place along a line through the point 3, and the side surfaces of the teeth lie on a series of straight radial lines all of which pass through the point 3.

If the tops of the teeth of the generating wheel are cut along a conical surface, the top of which lies in the point 3, and if the bottom surfaces of the gaps between the teeth constitute portions of the side-surface of another conical surface, the top of which also lies in the point 3, teeth of hitherto used shape will be generated on the cone 4 during its rolling movement on the generating wheel, i. e., the limiting surfaces of all gaps as well as the top surfaces of the teeth converge, if extended, in one and the same point. The tooth walls or surfaces generated by such a generating wheel will also lie on a series of straight radial lines converging on a point such as 3 in the manner mentioned above. It will, however, be easily understood that the tops of the teeth of the generating wheel may also be cut in any other manner without interfering with the above described formation of the side surfaces of the teeth generated. Thus the teeth 2 may for instance be cut along a surface cutting the flanks of the teeth along lines parallel to the top lines of the teeth and consequently, parallel to each other. That is to say, the tops of the teeth may be flattened as if they had been shaved off evenly along their entire length.

In the practical manufacture of gearwheels according to the present invention, the generating wheel may be substituted by an elongated cutting tool extending over the full length of the tooth and conveniently of the shape corresponding to that of a tooth of the generating wheel formed in cross-section in the above last mentioned manner, viz., as a triangle whose apex has been cut away to provide a flattened top edge surface. This cutting tool and a gear-wheel blank are then caused to move in relation to each other in the same manner as a tooth of the generating wheel and the cone 4, at the same time causing the cutting tool to make a cutting movement. This is illustrated in Figs. 3 to 6 of the drawing in which 5 designates a gear-wheel blank and 6 a tool shown diagrammatically. The latter may be composed of or form a series of cutting edges arranged one behind another and its fundamental form constitutes a truncated wedge having plane side surfaces and a plane parallel-sided surface near to the apex of the wedge. The two side surfaces will intersect each other, if extended, along the line 7—8 corresponding to the top or apex line of a tooth 2 of the generating wheel 1 (Figs. 1 and 2). In order that the tool 6 during its cutting movement shall produce theoretically accurate flanks or side surfaces on the teeth, it is necessary, as will be easily evident from the above discussion concerning Figs. 1 and 2, that the tool always maintains such a position in relation to the gearwheel blank, that the supposed line 7—8 always passes through the apex A of the pitch-cone of the gear-wheel blank and that the tool, in addition moves relatively to the gear-wheel blank in the same manner as a tooth of the generating wheel 1 moves in relation to the cone 4.

According to Fig. 3, in which the direction of movement of the gear-wheel blank and of the tool (apart from the cutting movement of the latter) is indicated by the arrow a, the tool has cut into the gear-wheel blank so far, that it has commenced to form one side (in the figure the right side) of the gap between two teeth. The surface so formed is shown in full lines and is so formed as to lie on a series of straight lines such as the line 10. This line which, as will the other straight lines of the series, indicates a temporary contact line between the tool and the gear-wheel blank, passes, if extended, as will be evident from the foregoing description, through the point A. In Fig. 4 the tool has reached a middle position relatively to the gear-wheel blank. The tool has now, by means of its right side according to the illustration, formed the right wall of the gap to such an extent, as is requisite for its engagement with a tooth of a coöperating gear-wheel. The bottom of the gap, which in this case will be exactly or substantially of the same width throughout, is also finished, and the left edge of the tool has, to the left side of the bottom of the gap, cut a comparatively sharply defined angular portion, which will form a part of the left side of the finished gap, but which does not actually constitute a part of the working surface of the tooth and the shape of which, consequently, is of no importance. A corresponding sharp angular cut will also be made on the right of the bottom of the gap, as the tool and the gear-wheel bank continue their movement from the middle position shown in Fig. 4 during the formation of the left side of the gap. Two different stages of this forming operation are shown in Figs. 5 and 6.

As is evident from the above, it is possible, by means of a single tool and in the same working operation, to form both sides of the gap between two adjacent teeth, the gap having its sides formed on correct theoretical lines and the bottom located on a conical or pyramidal surface, the top B of which, Fig. 4, lies above the apex of the pitch-cone, reckoning from the gear-wheel. In order that two gear-wheels of the shape in question shall be able to coöperate, it is necessary to form the upper surfaces of the teeth on different lines to those hitherto employed, so as to accommodate them to the different angle of slope of the bottoms of the gaps just described. Thus the tops will be cut along a conical surface, the top C of which, Fig. 4, is situated nearer to the gear-wheel than the top of the pitch-cone.

By such a formation of the teeth an important advantage is, however, attained, because the engagement of the teeth of two co-acting gear-wheels commences at the outer ends of the teeth and continues along longer and longer lines, until it extends finally along the whole length of the teeth. On account thereof the engagement of the teeth will be gradual, and the running of the gear will be noiseless and smooth.

Of course, the invention is also applicable to bevel gear-wheels in which the teeth are inclined relatively to radial planes through the axis of the gear-wheel, i. e., skew or non-radial teeth. Such a wheel is shown in Fig. 7 in side view and plan. Also in this case each gap may be cut in a single working operation by means of the tool described above. In this case, however, the imaginary apex-line 7—8 of the tool has to touch a sphere, the center of which coincides with the top of the pitch-cone of the gear-wheel blank.

Having thus described my invention what I claim as new and desire to secure by Letters Patent is:—

1. A bevel gear having the top faces of its teeth and the bottoms of the spaces between the teeth located in cones which intersect the pitch cone between the apex of the pitch cone and the inner ends of the teeth, substantially as and for the purpose described.

2. A bevel gear-wheel having the bottom surfaces of the gaps between adjacent teeth lying on or approximately on the surface of a cone or other convergent pyramidal surface whose apex is situated beyond (measured from the gear-wheel) the apex of the normal pitch-cone, and having the side surfaces of the teeth formed on substantially customary theoretically correct lines convergent upon the apex of the normal pitch cone, substantially as and for the purpose set forth.

3. A bevel gear-wheel having the bottom surfaces of the gaps between adjacent teeth lying on or approximately on the surface of a cone or other convergent pyramidal surface whose apex is situated beyond (measured from the gear wheel) the apex of the normal pitch-cone, and having the side surfaces of the teeth formed on substantially customary theoretically correct lines convergent upon the apex of the normal pitch-cone, and having the bottom surface of a gap aforesaid of uniform width throughout its length, substantially as and for the purpose set forth.

4. A bevel gear-wheel having the bottom surfaces of the gaps between adjacent teeth lying on or approximately on the surface of a cone or other convergent pyramidal surface whose apex is situated beyond (measured from the gear-wheel) the apex of the normal pitch-cone, and having the side surfaces of the teeth formed on substantially customary theoretically correct lines convergent upon the apex of the normal pitch-cone, and having the top edges of the teeth lying on or approximately on the surface of a cone or other pyramid whose apex is situated nearer to the wheel than is the apex of the normal pitch-cone, substantially as and for the purpose set forth.

5. A bevel gear-wheel having the bottom surfaces of the gaps between adjacent teeth lying on or approximately on the surface of a cone or other convergent pyramidal surface whose apex is situated beyond (measured from the gear-wheel) the apex of the normal pitch-cone, and having the side surfaces of the teeth formed on substantially customary theoretically correct lines convergent upon the apex of the normal pitch-cone, and having the bottom surface of a gap aforesaid of uniform width throughout its length, while the top edges of the teeth lie on the surface of a cone or other pyramid whose apex is situated nearer to the wheel than is the apex of the normal pitch-cone, substantially as and for the purpose set forth.

6. A bevel gear having the top faces of its teeth and the bottoms of the spaces between the teeth located in cones which intersect the pitch cone between the apex of the pitch cone and the inner ends of the teeth and having the bottoms of the spaces between the teeth and the tops of the teeth of uniform width throughout their length, substantially as and for the purpose described.

In testimony whereof I have hereunto set my hand in presence of two subscribing witnesses.

ERIK HJALMAR WINGQVIST.

Witnesses:
ELSA HUETMARK,
KARL RUNESKOG.